United States Patent
Somerfield

(10) Patent No.: US 10,954,666 B2
(45) Date of Patent: Mar. 23, 2021

(54) ANCHOR DEVICE

(71) Applicant: Gripple Limited, Sheffield (GB)

(72) Inventor: Alan Somerfield, Lincolnshire (GB)

(73) Assignee: GRIPPLE LIMITED

( * ) Notice: Subject to any disclaimer, the term of this patent is extended or adjusted under 35 U.S.C. 154(b) by 628 days.

(21) Appl. No.: 15/873,611

(22) Filed: Jan. 17, 2018

(65) Prior Publication Data

US 2018/0142464 A1 May 24, 2018

Related U.S. Application Data

(62) Division of application No. 14/126,775, filed as application No. PCT/GB2012/000455 on May 23, 2012, now abandoned.

(30) Foreign Application Priority Data

Jun. 21, 2011 (GB) .................................. 1110461
May 8, 2012 (GB) .................................. 1208011
May 22, 2012 (GB) .................................. 1208962

(51) Int. Cl.
  *E04B 1/41* (2006.01)
  *F16B 13/08* (2006.01)
  *B21D 39/00* (2006.01)

(52) U.S. Cl.
  CPC ................ *E04B 1/41* (2013.01); *B21D 39/00* (2013.01); *E04B 1/4114* (2013.01); *F16B 13/0833* (2013.01); *E04B 1/4171* (2013.01); *Y10T 29/4984* (2015.01); *Y10T 29/49888* (2015.01); *Y10T 29/49945* (2015.01); *Y10T 29/49947* (2015.01); *Y10T 29/49948* (2015.01); *Y10T 403/7009* (2015.01)

(58) Field of Classification Search
  CPC .......... F16B 13/0833; Y10T 403/7009; Y10T 29/4984; Y10T 29/49945; Y10T 29/49947; Y10T 29/49948; Y10T 29/49888; B23P 19/12; B21D 39/00
  See application file for complete search history.

(56) References Cited

U.S. PATENT DOCUMENTS

| 1,169,635 A | 1/1916 | Grimes |
| 1,264,189 A | 4/1918 | Keator |
| 1,352,919 A | 9/1920 | Salmons et al. |
| 1,353,159 A | 9/1920 | Hammermann |

(Continued)

FOREIGN PATENT DOCUMENTS

| DE | 800914 | 12/1950 |
| DE | 1870167 | 4/1963 |

(Continued)

*Primary Examiner* — Jermie E Cozart
(74) *Attorney, Agent, or Firm* — Clark Hill PLC; James R. Foley

(57) ABSTRACT

An anchor device for a floor, the anchor device comprising an article securing arrangement to which an article can be secured. The article has a moveable securing mechanism. The article securing arrangement defines a cavity to receive the moveable securing mechanism, and the article securing arrangement includes a co-operating means to co-operate with the moveable securing mechanism in the cavity and secure the article to the anchor device. The anchor device has a height which is no more than 30 mm.

10 Claims, 12 Drawing Sheets

(56) References Cited

U.S. PATENT DOCUMENTS

| | | |
|---|---|---|
| 1,684,605 A | 9/1928 | Techmer |
| 1,826,201 A | 10/1931 | Carroll |
| 1,924,884 A | 8/1933 | Schaffert |
| 1,999,704 A | 4/1935 | Rigney |
| 2,301,135 A | 11/1942 | Molat |
| 2,578,515 A | 12/1951 | Crofton |
| 3,279,302 A | 10/1966 | Modrey |
| 3,848,386 A | 11/1974 | Catallozzi |
| 3,861,267 A | 1/1975 | Collister |
| 3,896,599 A | 7/1975 | Werstein et al. |
| 4,075,924 A | 2/1978 | McSherry et al. |
| 4,615,514 A | 10/1986 | Hamlin |
| 4,834,601 A | 5/1989 | Schaap |
| 5,215,418 A | 6/1993 | Trainer et al. |
| 5,221,169 A | 6/1993 | McSherry et al. |
| 5,275,518 A | 1/1994 | Guenther |
| 5,417,531 A | 5/1995 | Brown |
| 5,507,611 A | 4/1996 | Collister |
| 5,798,021 A | 8/1998 | Stiles |
| 5,803,688 A | 9/1998 | Gleason et al. |
| 5,897,300 A | 4/1999 | Luedtke |
| 5,944,466 A | 8/1999 | Rudnicki et al. |
| 5,991,984 A | 11/1999 | Schaty |
| 6,109,587 A | 8/2000 | Peacock et al. |
| 6,318,941 B1 | 11/2001 | Guenther |
| 6,450,505 B1 | 9/2002 | Gavin |
| 7,192,303 B2 * | 3/2007 | Kohen .................... F21V 21/03 439/135 |
| 7,334,767 B2 * | 2/2008 | Wright .................... B25B 13/46 248/342 |
| 7,628,366 B2 * | 12/2009 | Scott ...................... F21V 21/04 248/317 |
| 7,736,108 B1 | 6/2010 | Bruce et al. |
| 8,132,435 B2 | 3/2012 | Thomas et al. |
| 8,449,236 B2 | 5/2013 | McDuff et al. |
| 2004/0170486 A1 | 9/2004 | DeMeo |
| 2006/0182514 A1 | 8/2006 | Ito |
| 2009/0053007 A1 | 2/2009 | Rafaeli |
| 2009/0249738 A1 | 10/2009 | Brereton et al. |
| 2010/0290859 A1 | 11/2010 | Noce et al. |
| 2011/0107715 A1 | 5/2011 | Cooke |

FOREIGN PATENT DOCUMENTS

| | | |
|---|---|---|
| DE | 3732180 | 4/1989 |
| GB | 395835 | 7/1933 |
| GB | 972354 | 10/1976 |
| JP | 2008-266917 | 11/2008 |
| JP | 2010-270495 | 12/2010 |
| WO | 96/06992 | 3/1996 |

* cited by examiner

ANCHOR DEVICE

RELATED APPLICATION (PRIORITY CLAIM)

This application is a divisional application of U.S. patent application Ser. No. 14/126,775, filed Dec. 16, 2013.

BACKGROUND OF THE INVENTION

This invention relates to anchor devices for floors. More particularly, but not exclusively, this invention relates to anchor devices for metal deck or wood form floors. Embodiments of the invention relate to anchor devices for concrete floors.

In some buildings, concrete floors are provided in storeys above ground level. It is often necessary to provide anchor devices to which light fittings can be attached for the room below. The concrete floor can be arranged over a wood form or metal deck, on which the anchor devices are mounted. In the case of wooden forms, the anchor device can be removably mounted on the wooden forms. The wooden forms are removed once the concrete has set to leave the concrete with anchors embedded therein.

BRIEF SUMMARY OF THE INVENTION

According to one aspect of this invention, there is provided an anchor device for a floor, the anchor device comprising an article securing arrangement to which an article can be secured, wherein the article securing arrangement defines a cavity to receive a portion of the article, and the anchor device has a height which is no more than 30 mm.

The article securing arrangement may have an underside and the article may be secured to the article securing arrangement through said underside.

The article may have a moveable securing mechanism, and the cavity may be configured to receive the moveable securing mechanism. The article securing arrangement may include co-operating means to co-operate with the moveable securing mechanism in the cavity and secure the article to the anchor device.

According to another aspect of this invention, there is provided an anchor device for a floor, the anchor device comprising an article securing arrangement to which an article can be secured from below, wherein the article securing arrangement defines a cavity to receive the article, and the article securing arrangement includes a co-operating means to co-operate with the article in the cavity and secure the article to the anchor device.

According to another aspect of this invention, there is provided an anchor device for a floor, the anchor device comprising an article securing arrangement to which an article can be secured, the article having a moveable securing mechanism, wherein the article securing arrangement defines a cavity to receive the moveable securing mechanism, and the article securing arrangement includes co-operating means to cooperate with the moveable securing mechanism in the cavity and secure the article to the anchor device.

According to another aspect of this invention, there is provided an anchor assembly comprising an anchor device as described above and an article comprising a moveable securing mechanism, wherein the article securing arrangement defines a cavity to receive the moveable securing mechanism, and the article securing arrangement includes co-operating means to co-operate with the moveable securing mechanism in the cavity and secure the article to the anchor device.

The securing mechanism may comprise a main part and a securing member movably mounted on the main part. The securing member may be pivotally mounted on the main part. The securing arrangement may be configured to receive the securing mechanism from below. The securing arrangement may have an underside, and may be configured to receive the securing mechanism through said underside.

The anchor device may further include fastening means to enable the anchor device to be fastened to the floor. The floor may comprise a metal deck or wood form floor.

The anchor device may have a low profile configuration. The anchor device may have a height which is no more than 30 mm.

The article securing arrangement may comprise a body part comprising a base element and a cover element extending over the base element. The base element and the cover element may define the cavity. The securing arrangement may be configured to receive the securing mechanism through the base element.

The article securing arrangement may define an aperture through which the article can extend. The aperture may be defined by the base element. The co-operating means may comprise the base element.

The securing mechanism may be moveable from a non-securing condition to a securing condition. When the securing mechanism is in the non-securing condition, the securing mechanism can be inserted into the cavity. When the securing mechanism is in the securing condition in the cavity, the article is secured to the anchor device.

The securing member may be moveable, for example pivotally moveable, relative to the main part from a non-securing position, to allow the securing member to be inserted into the cavity, to a securing position, to secure the securing member in the cavity and thereby secure the article to the anchor device. When the securing member is in the non-securing position, the securing member may be aligned with the main part. When the securing member is in the securing position, the securing member may extend transverse to the main part.

The cavity may be wider than the aperture, whereby when the securing member is received in the cavity, movement of the securing member to the securing position moves the securing member to a position in which it extends across the aperture to engage the base element, thereby retaining the securing member in the cavity.

The securing member may be pivotally mounted on the main portion of the article, and may be pivotally moveable from the non-securing position to the securing position.

The anchor device may include a floor engaging member for engaging the floor, the floor engaging member defining a channel therethrough in communication with the aperture, whereby the article can extend through the aperture and through the channel.

In a first embodiment, the anchor device may include a receiving arrangement defining a space for receiving a curable material, such as concrete. The receiving arrangement may define at least one gap providing communication with the space, to allow said curable material to enter the space. The receiving arrangement may define a plurality of said gaps. The first embodiment may be suitable for use with a floor made with a wood form, The receiving arrangement may comprise a plurality of outwardly extending fingers, wherein the, or each, gap is defined between adjacent fingers. The fingers may extend to a region substantially coplanar with a lower region of the article securing arrangement, such as the floor engaging member. The receiving arrangement may extend from the article securing arrangement.

The receiving arrangement may comprise first and second support portions extending from the article securing arrangement. The first and second support portions may extend opposite each other from the body part. The base element may extend outwardly from the body part to provide the, or each, support portion.

The receiving arrangement may further include a plurality of the fingers on each of the first and second support portions. Each of the fingers may have distal free end region for engaging the surface. The distal free end region may be V shaped.

Alternatively, the distal end region of the fingers may be connected to one another by a connecting member. The connecting member may be substantially circular, and may comprise a web. The connecting member may extend substantially wholly around the article securing arrangement. The distal end region of each finger may taper outwardly to a wide portion, wherein said wide portion is attached to the connecting member. The article securing arrangement may be configured to substantially prevent the curable material being received in the cavity.

The fastening means may comprise a fastener holding means for holding a fastener. The fastener may comprise a screw or a nail, and the holding means may comprise a holding member, which may be tubular. The fastener may extend through the holding member.

The holding means may comprise two holding members, which may be arranged opposite each other on the article securing arrangement.

In a second embodiment, suitable for use with a floor made with a metal deck, the fastening means may comprise a fastening member, which can be inserted through an opening in the floor. The fastening member may comprise a tube through which the article can extend.

The fastening member may include a formation for engaging the floor around said opening, and thereby fasten the anchor device to the floor. The formation may comprise a detent formation. The detent formation may be defined by the fastening member. The recess may extend around the fastening member.

The fastening means may comprise a floor engaging member configured to engage the floor. The floor engaging member may comprise an outwardly extending member extending outwardly from the fastening member. The outwardly extending member may extend radially outwardly from the fastening member.

The base element of the second embodiment may be arranged between the cover element and the fastening means. The cover element may have a body portion to define the cavity. The cover element may also have a flange portion extending outwardly from the main portion to engage the base element.

The flange portion and the body portion of the cover have corresponding cooperating formations which may co-operate with each other to attach the cover element to the base element. The co-operating formations may comprise a plurality of through holes and a plurality of corresponding push-fit members which can be received in the holes, thereby securing the cover element to the base element. In one embodiment, the holes may be defined by the base element and the push-fit members may be provided on the cover element.

The floor engaging member of the fastening means may have formations to cooperate with corresponding formations on the article securing arrangement. The formations may be holes in the floor engaging member to receive the push-fit members on the cover element.

BRIEF DESCRIPTION OF THE DRAWINGS

Embodiments of the invention will now be described by way of example only, with reference to the accompanying drawings, in which.

DETAILED DESCRIPTION OF EMBODIMENTS OF THE INVENTION

Figure 1:
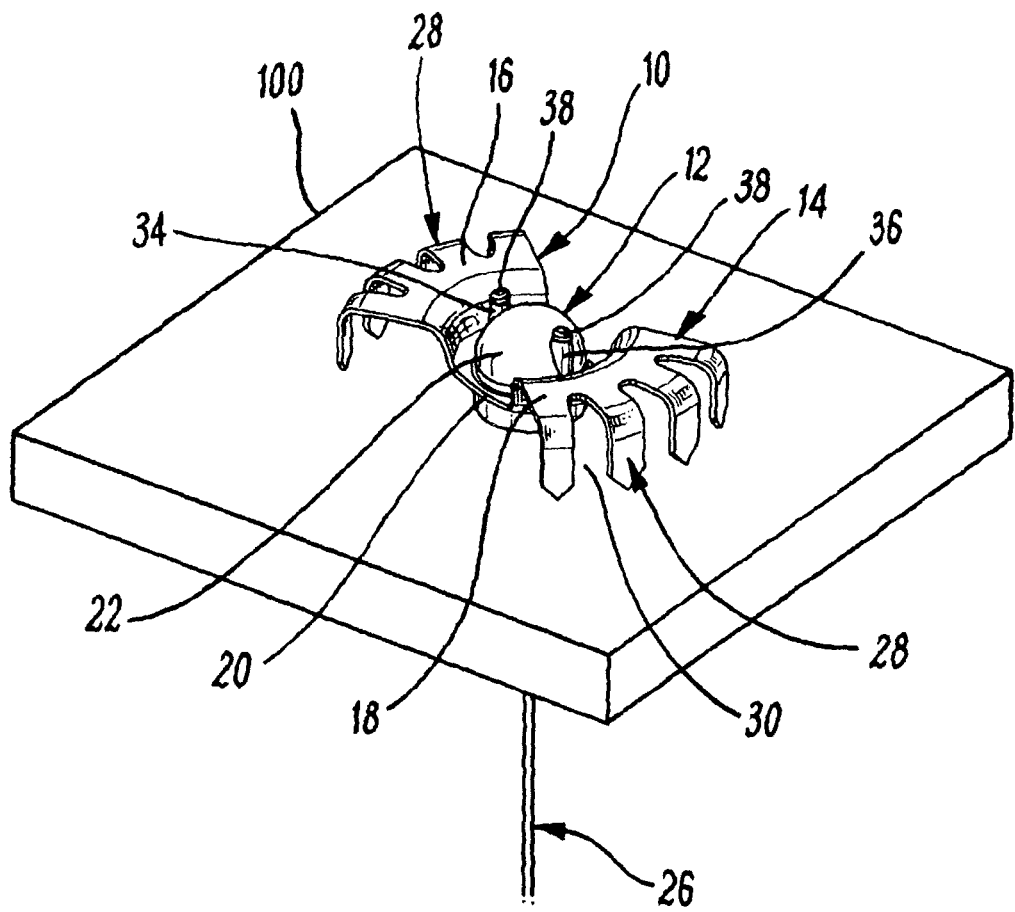
FIG. 1 is a perspective view of a first embodiment of an anchor device in use.
Figure 2:
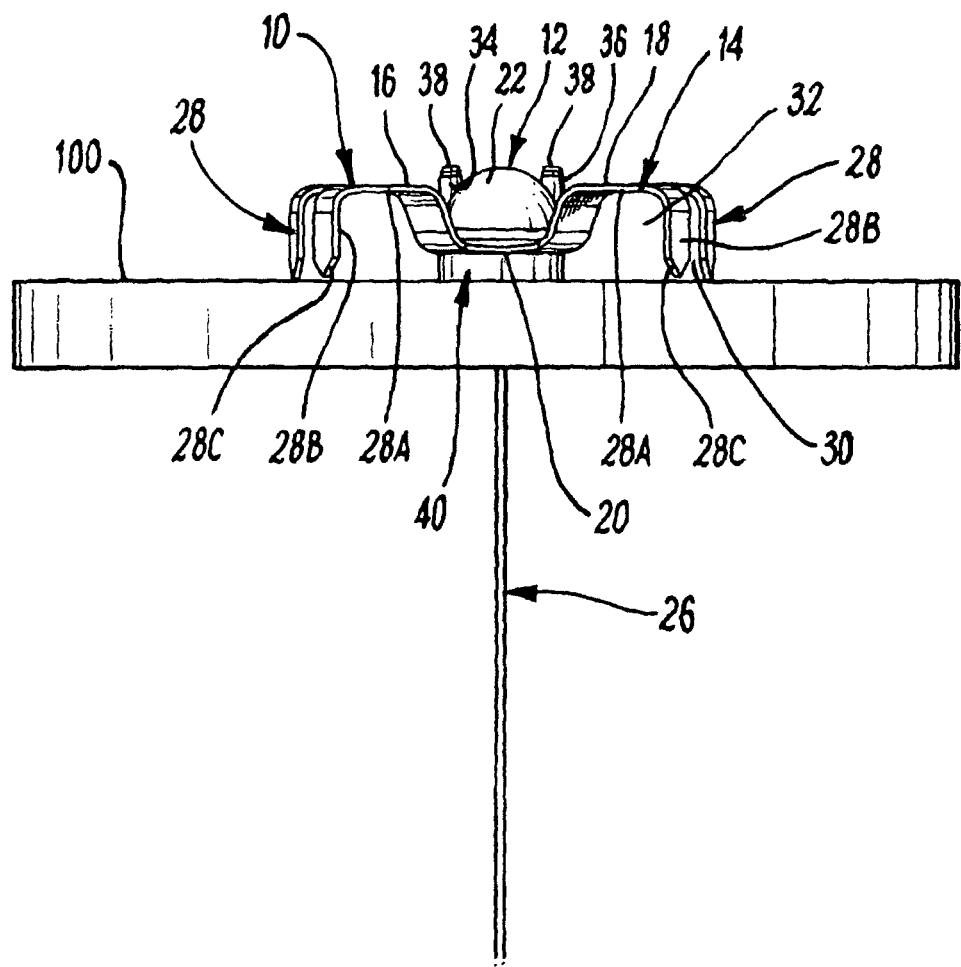
FIG. 2 is a side view of the first embodiment of the anchor device in use.
Figure 3:
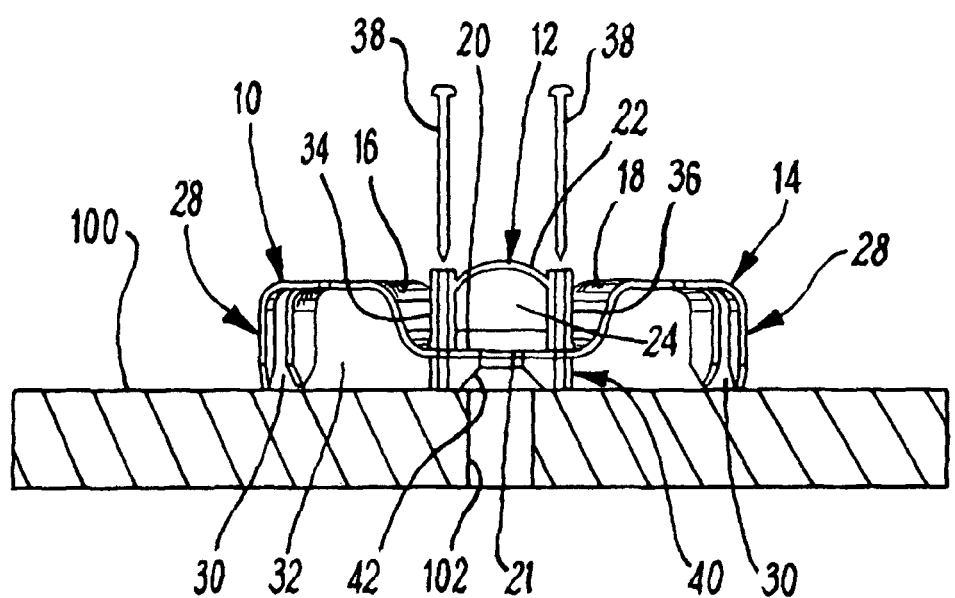
FIG. 3 is a sectional side view of the first embodiment of the anchor device being fastened to a surface.

Referring to the FIGS. 1 to 5 of the drawings, there is shown a first embodiment of an anchor device 10 for use in providing an anchor device on a floor. In the embodiment shown, the anchor device 10 is used for securing, for example, a ceiling light to a ceiling. The anchor device 10 is arranged on the floor above the room where the ceiling light is to be installed. The cable for the ceiling light extends downwardly from the anchor device 10 through the floor to the room below, so that the ceiling light is suspended from the ceiling of the room below.

The anchor device 10 is particularly useful where the floor is to be a concrete floor. In such circumstances, the concrete floor is constructed by first providing a wood form 100 upon which the concrete is laid. When the concrete has set the wood form is removed.

Prior to pouring the concrete, the anchor device 10 is arranged on the wood form 00 in positions where a ceiling light is to hang from the ceiling of the room below. Alternatively, the wood form may remain in place. An opening 102 (see FIGS. 3, 4 and 5) can be drilled through the wood form 100 prior to mounting of the anchor device 10 thereon. The anchor device 10 comprises an article securing arrangement 12 and a receiving arrangement 14. The receiving arrangement 14 comprises first and second support portions 16, 18 extending opposite each other from the article securing arrangement 12.

The article securing arrangement 12 comprises a body part in the form of a base element 20 and a dome shaped cover element 22. The base element 20 defines an aperture 21 therethrough. The cover element 22 extends over the base element 20 and defines a cavity 24 therewith. The cover element 22 provides a seal around the base element 20, thereby preventing the concrete from being received therein.

An article can extend through the aperture 21 into the cavity 24. In the embodiment described herein, the article is an elongate suspension device 26, which may be used for suspending a ceiling light. The suspension device 26 includes a securing mechanism 27. The securing mechanism 27 is secured in the cavity 24 in a manner described below. Thus, an anchor assembly is provided, the anchor assembly comprising the anchor device 10 and the elongate suspension device 26.

The base element 20 extends outwardly in opposite directions from the article securing arrangement 12 to provide the first and second support portions 16, 18. Thus, the base element 20 and the first and second support portions 16, 18 are formed of a single piece of a suitable material, for example a plastics material. The first and second support portions 16, 18 extend outwardly and upwardly from the base element 20.

The receiving arrangement 14 further includes a plurality of fingers 28 on the first and second support portions 16, 18. The embodiment shown in FIGS. 1 to 5 has eight fingers 28 arranged in two groups of four fingers 28 opposite each other.

The fingers 18 extend from, and are supported by, the first and second support portions 16, 18. Gaps 30 are defined between adjacent fingers 28. A receiving space 32 is defined by each of the first and second support portions 16, 18 and the fingers 28. The receiving space can receive concrete spread on the lower layer 100, as explained in more detail below.

Each finger 28 comprises a first region 28A extending outwardly from the first or second support portions 6, 18 and a second region 28B extending downwardly from the first regions 28A. Each of the second regions 28B has a V shaped distal end region 28C which can engage the lower layer 00.

The anchor device 10 further includes holding means in the form of first and second tubular holding members 34, 36, through which fasteners in the form of nails 38 can extend into the lower layer 100.

A floor engaging part 40 extends downwardly from the base part 20 and defines a channel 42 in communication with the aperture 21 in the base part 20. The channel 38 is aligned with the aperture 21, and tapers outwardly therefrom.

The anchor device 10 is disposed on the lower layer 100 with the aperture 21 and the channel 42 in alignment with the opening 102. In this position, the distal end regions 28C of the fingers 28 engage the lower layer 100. In order to fasten the anchor device 10 to the lower layer 100, nails 38 are driven through the tubular holding members 34, 36 into the lower layer 100.

Figure 5:
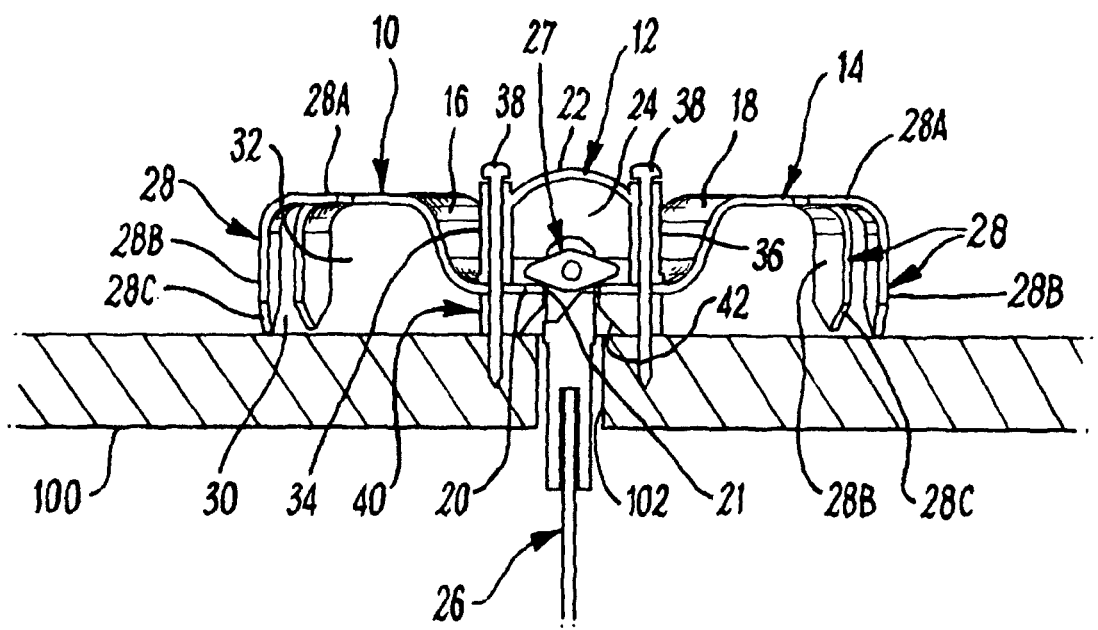
FIG. 5 is a sectional side view showing the article secured to the first embodiment of the anchor device, with the securing mechanism in a securing position.
Figure 6A:
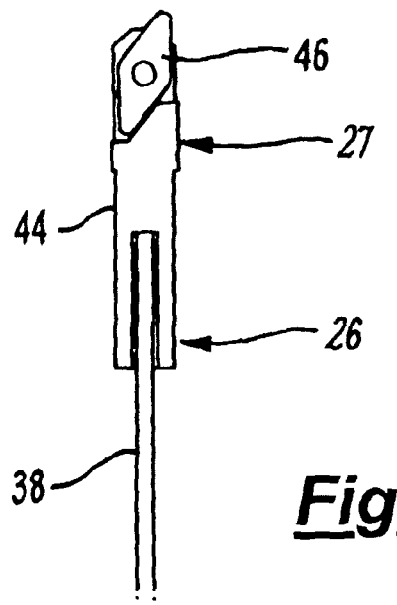
FIG. 6A shows the article with the securing mechanism in a non-securing position.
Figure 6B:
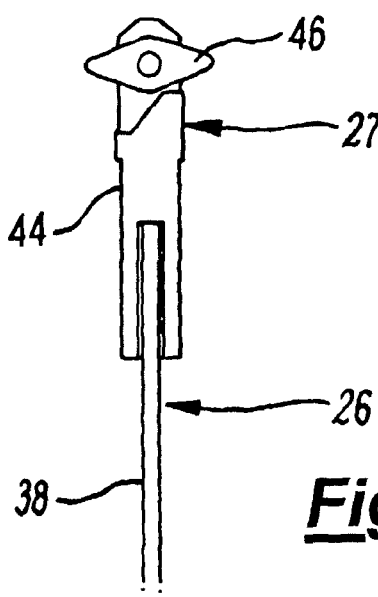
FIG. 6B shows the article with the securing mechanism in a securing position.
Figure 7:
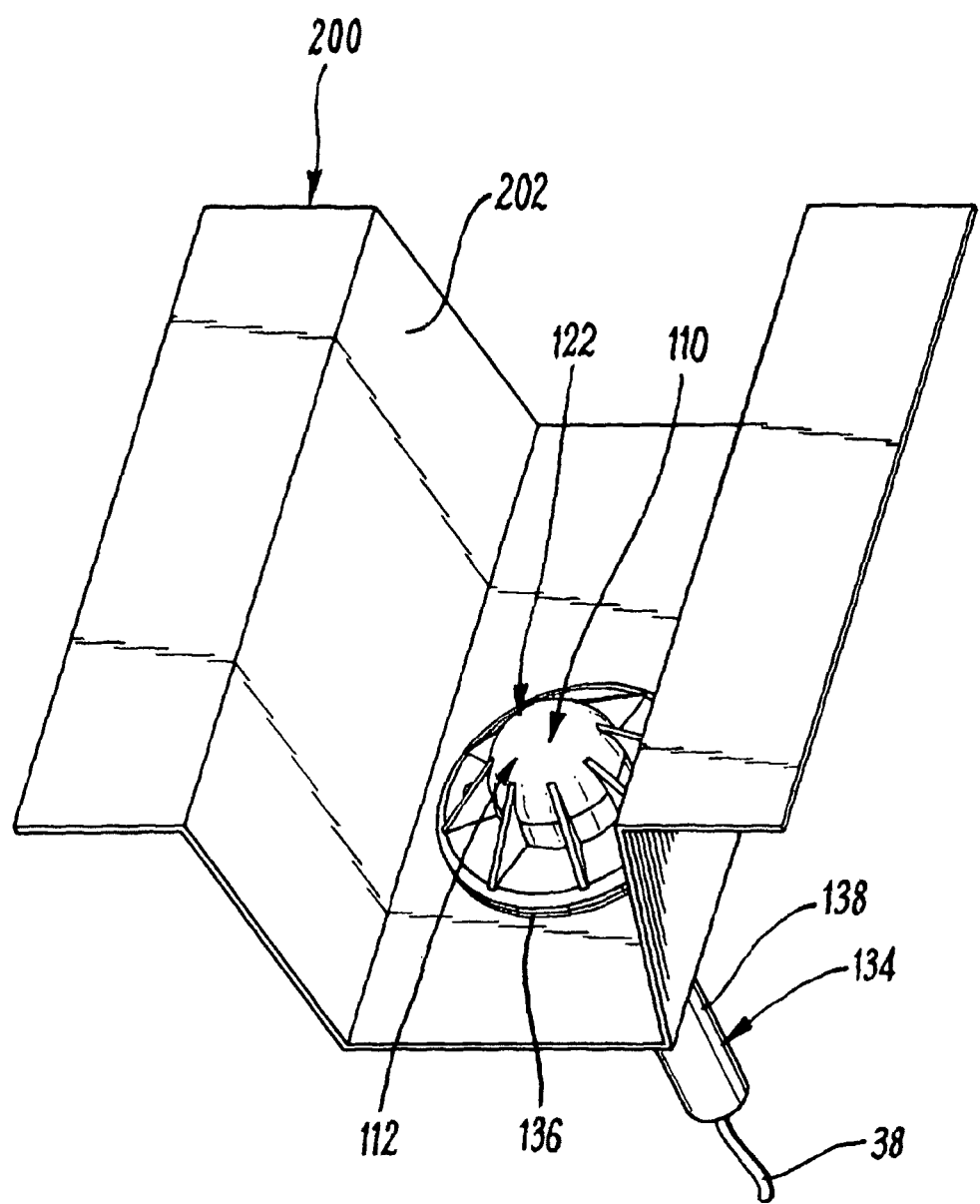
FIG. 7 shows a second embodiment of an anchor device mounted in a well of a floor deck.

Referring to FIGS. 6A and 6B, the suspension device 26 comprises the securing mechanism 27 and an elongate cable 38. The securing mechanism 27 is provided on one end of the cable 38. The securing mechanism 27 comprises a main part 44 and a securing member in the form of a toggle 46 pivotally mounted on the main part 44. The toggle 46 can pivot between a non-securing position shown in FIGS. 4 and 6, and a securing position shown in FIGS. 5 and 6B.

Figure 4:
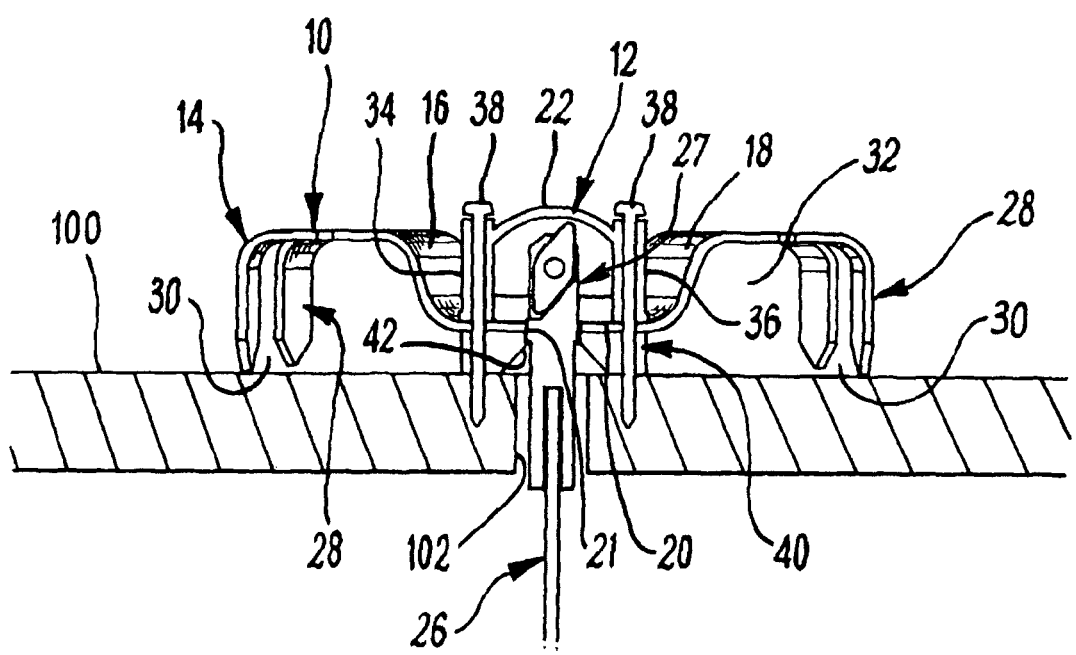
FIG. 4 is a sectional side view showing an article being secured to the first embodiment of the anchor device, with a securing mechanism in a non-securing position.

When the toggle 46 is in the securing position, the toggle 46 extends across the aperture 21, and cannot pass through the aperture 21. As a result, the toggle 46 is retained in the cavity 24, and the article is thus secured to the anchor device 10. As can be seen in FIG. 4, the suspension device 26 is installed in the anchor device 10 by disposing the toggle 46 in the non-securing position, and pushing the securing mechanism 27 through the opening 102 in the floor and through the channel 42 and the aperture 21. This inserts the toggle 46 into the cavity 24.

The toggle 46 is appropriately weighted so that, when it is inserted into the cavity 24, the toggle 46 pivots automatically to its securing position shown in FIG. 5. This prevents the securing mechanism 27 from being removed from the anchor device 10, thereby securing the suspension device 26 to the anchor device 0.

Alternatively, the toggle can be inserted into the cavity 24 so that, upon insertion, the toggle 46 engages the inside of the cover element 22, which dislodges the toggle 46 from its non-securing position to its securing position.

When the anchor device 10 has been fastened to the lower layer 100 by the use of the nails 38, as described above, the concrete is spread over the lower layer 100, and over the anchor device 0 so that the anchor device 10 is wholly embedded within the concrete.

During such spreading, the concrete flows through the gaps 30 between the fingers 28, and into the receiving spaces 32. When the concrete sets, the anchor device 10 is held in its position on the lower layer by the nails 38 and the concrete.

There is thus described an anchor device 10 which allows suspension arrangements to be anchored thereon from which lights can be suspended.

The anchor device 0 has an advantage that, in the embodiment described herein, the receiving portions extend outwardly from the main body over a distance which is substantially equal to the diameter of the main body. This allows the anchor device 10 to be of a low profile configuration, thereby making it less likely that workers pouring the concrete over the anchor device 10 will accidentally kick it thereby damaging it or themselves. A second embodiment of the invention is shown in FIGS. 7 to 10.

The second embodiment of the anchor device is generally designated 110, and is intended to be mounted in a well 202 of a metal deck 200 forming a floor (not shown). After the necessary number of the anchor devices 10 are mounted on the metal deck 200, concrete can be laid on the deck 200 to form the floor.

Figure 8:
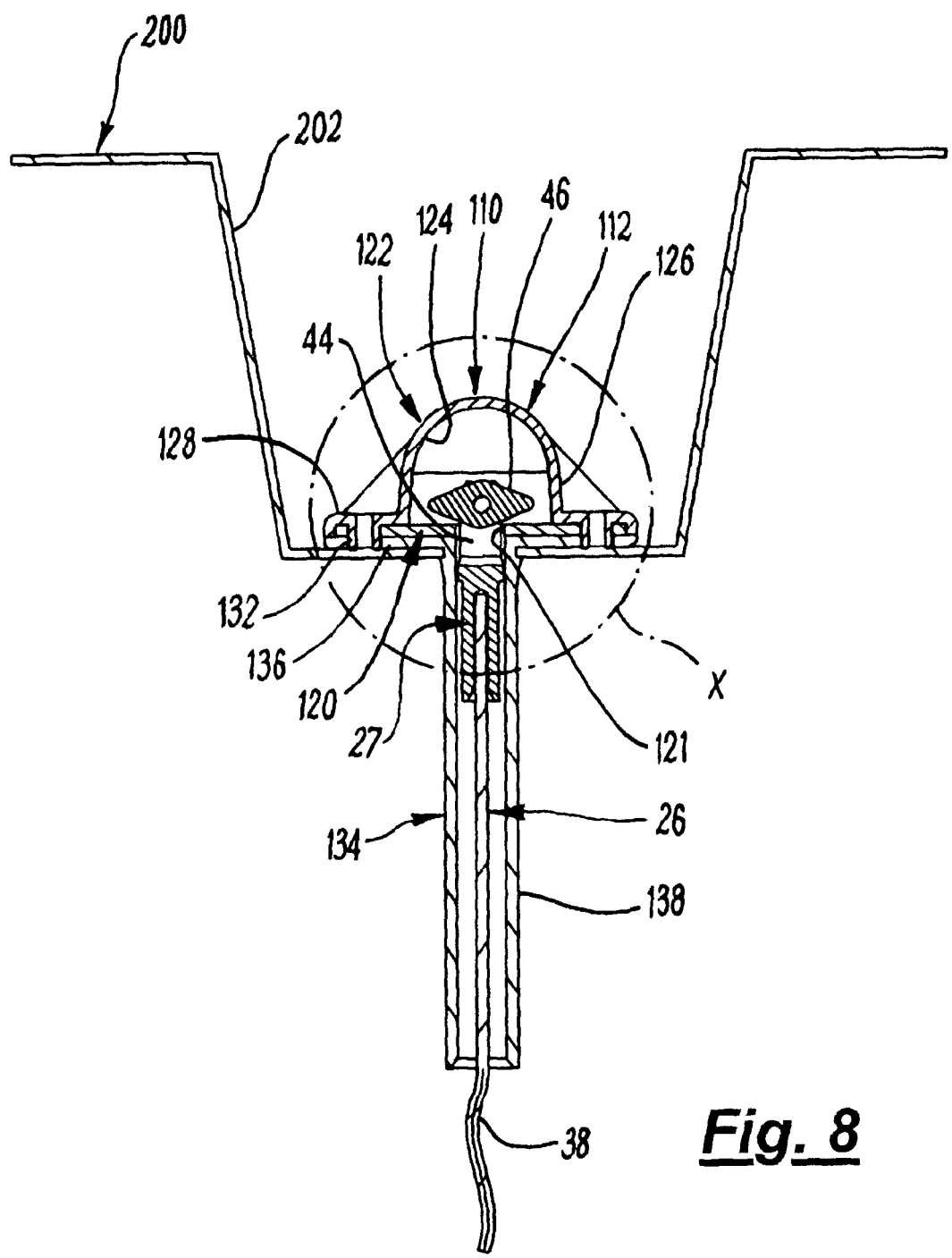
FIG. 8 is a sectional side view of the second embodiment of the anchor device.
Figure 9:
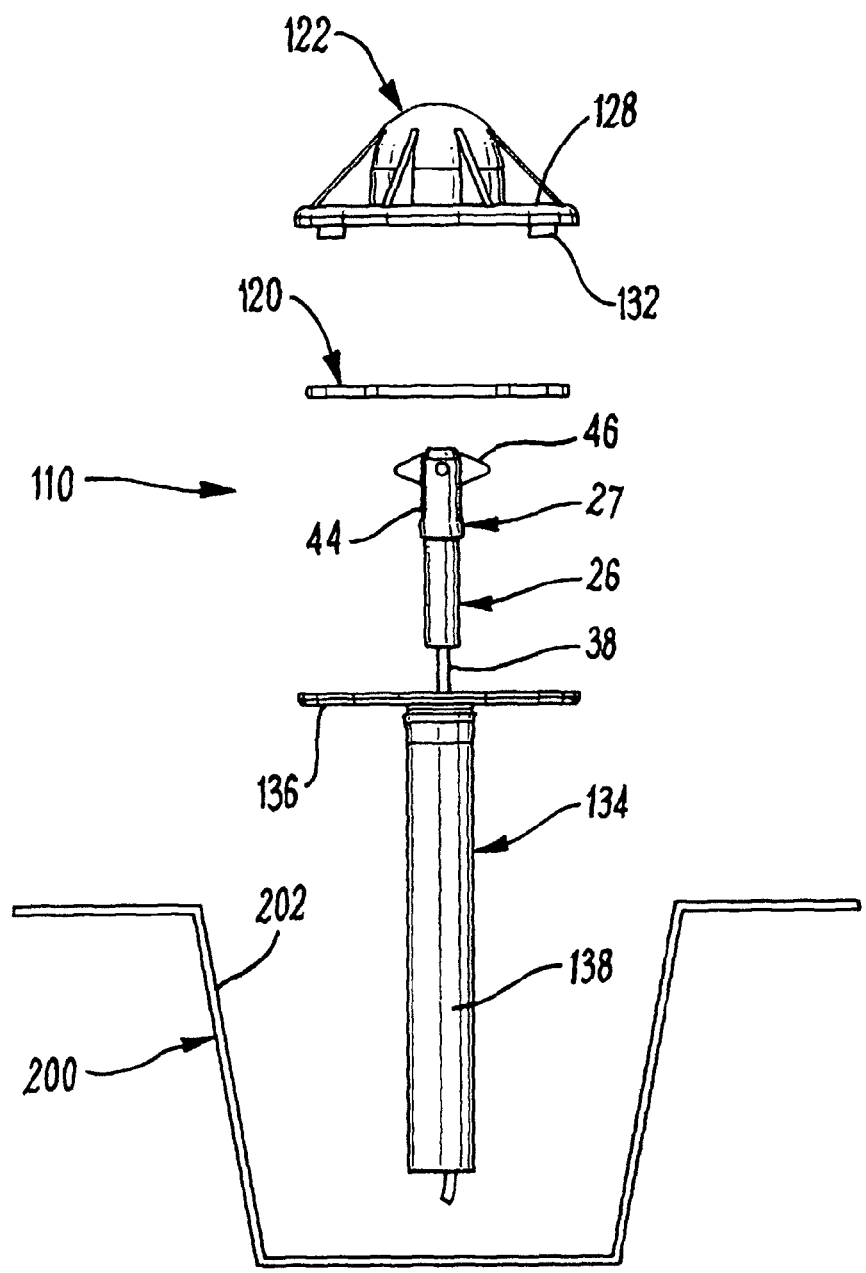
FIG. 9 is an exploded view of the second embodiment of the anchor device.
Figure 10:
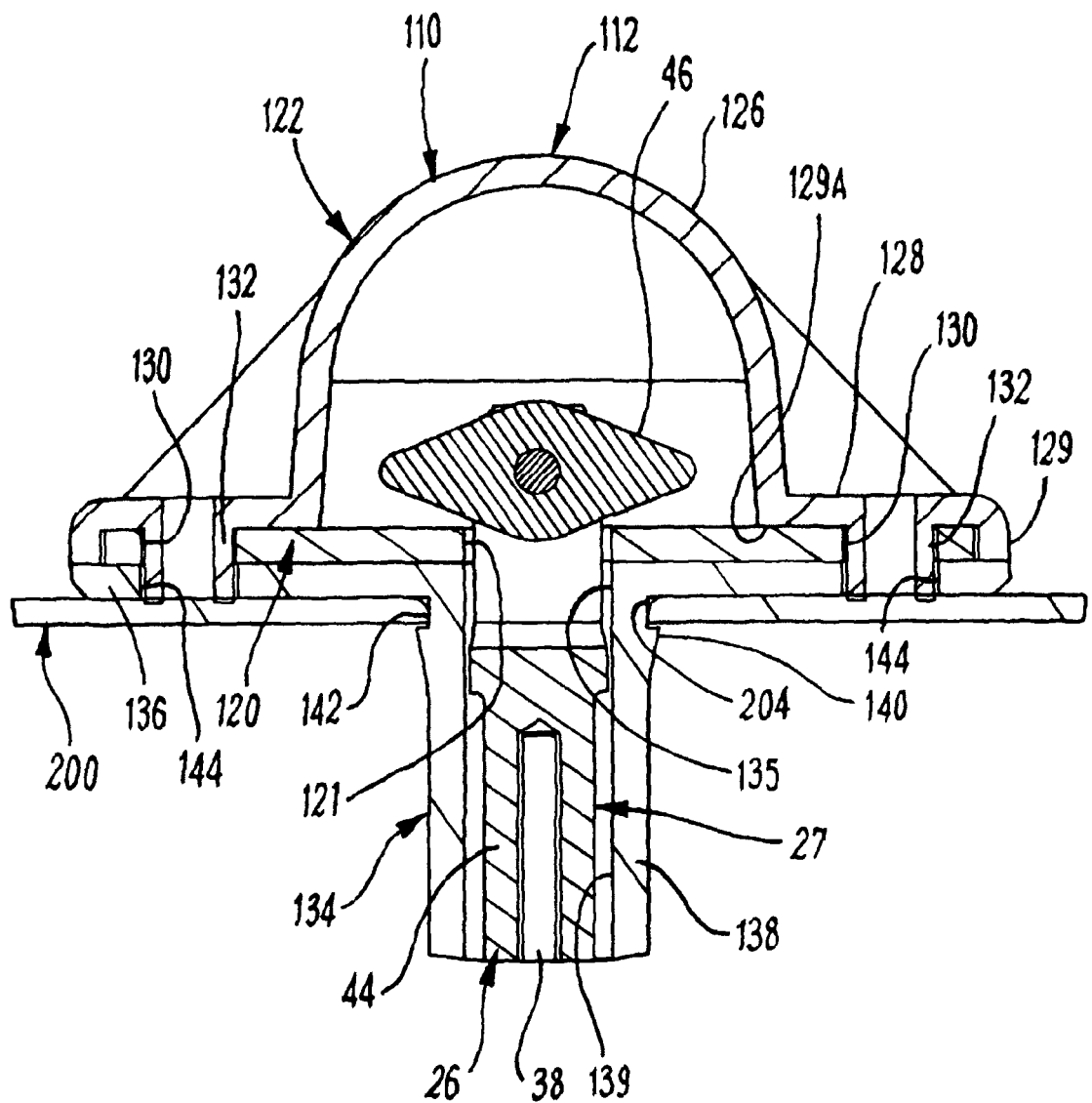
FIG. 10 is a close up of the region marked X in FIG. 8.

Referring to FIGS. 8, 9 and 10, the anchor device 110 comprises an article securing arrangement 2, which comprises a base element 120 and a cover element 122. The base element 120 defines an aperture 121.

The cover element 122 is mounted on the base element 120 and defines a cavity 24 therewith, the aperture 121 providing communication between a region external of the anchor device 110 and the cavity 124. The cover element 122 provides a seal around the base element 120, thereby preventing the concrete from being received therein.

The cover element 122 has a dome shaped body portion 126, which defines the cavity 124 with the base element 120. The cover element 122 may also have a substantially circular flange portion 128 extending outwardly from the body portion 126 to engage the base element 120.

A circumferential edge member 129 extends downwardly from the flange portion 128 at the outer edge thereof. The edge member 129 defines a circular shallow recess 129A in which the base element 120 is received. The base element 120 is of a size that it just fits within the recess 129A.

The base element 120 is in the form of a substantially circular disc. The aperture 121 is defined substantially centrally of the base element 120. The base element also defines a plurality of through holes 30 (see FIG. 10) arranged in a circumferential array adjacent the outer edge of the base element 120. The flange portion 128 of the cover element 122 has a plurality of downwardly extending push-fit members 32. The push-fit members 132 and the through holes 130 are provided on or in the respective flange portion 28 and base element 120 in corresponding positions. The positions of the through holes 130 and the push-fit members 132 are such that the push-fit members 32 are received in the through holes 130 when the base portion 120 is received in the recess 29A.

The push-fit members 132 are a tight fit within the through holes 30 and thereby secure the base element 120 to the cover element 122.

The anchor device 110 is mounted on the metal deck 200 over an opening 204 therein, and is positioned on the metal deck 200 so that the aperture 121 in the base element 20 is aligned with the opening 204, as shown in FIG. 10.

A fastening means 134 is provided to fasten the anchor 10 to the deck 200. The fastening means 134 comprises a floor engaging member 136 to engage the deck 200. The floor engaging member defines a central aperture 135.

The fastening means 134 further includes an elongate tubular fastening member 138 extending downwardly from the floor engaging member 136 at the aperture 35. The fastening member 138 defines a cylindrical passage 139 communicating with the aperture 135 in the floor engaging member 136.

The fastening member 38 has a fastening formation in the form of a detent 140 closely spaced from the floor engaging member 136. The detent 140 is circular and extends around the tubular fastening member 138.

A circular recess 142 is defined around the fastening member 138 between the detent 140 and the floor engaging member 136. In order to mount the fastening member on the deck 200, the tubular fastening member 138 is first inserted into the opening 121 from above, with the floor engaging member 136 uppermost. The fastening means 134 is then pushed downwardly through the opening 121 until the detent 140 engages the deck 200 around the opening 121. Further pushing of the fastening means 134 downwardly causes the detent 140 to deform inwardly until the detent passes over the deck 200. The detent 140 snaps back to its non-deformed position to engage the underside of the deck 200 around the opening 121. As a result, the region of the deck 200 surrounding the opening 121 is held between the detent 140 and the floor engaging member 136, thereby fastening the fastening means to the deck 200.

The article securing arrangement 112 fastened to the floor engaging member by means of the push-fit members 132. Lower portions of the push-fit members 132 extend beyond the through holes 130 on the underside of the base element 120.

The floor engaging member 136 defines a plurality of through holes 144 arranged in a circumferential array adjacent the outer edge of the base element floor engaging member 136. The positions of the through holes 144 are such that lower portions of the push-fit members 132 can be received in the through holes 144 when the anchor device is assembled as shown in FIG. 10.

A suspension device 26, similar to that described above can then be arranged so that the toggle 46 is in its non-securing position inserted upwardly through the tubular fastening member 138. When the toggle 46 is received in the cavity 124, it moves to the securing position shown in FIG. 10, either under its weight, or by being engaged against the inner surface of the cover element 122.

When the toggle 46 is in its securing position in the cavity 124, as shown in FIG. 10, it cannot be removed therefrom via the aperture 121 and, therefore, secures the suspension device 26 to the anchor device 110.

The provision of the securing mechanism 27 and the cavity 24, as described above provides the advantage that the height of the anchor devices 0, 0 is considerably less than known anchor devices. The height of each of the anchor devices 10, 1 10 shown in the drawings is substantially 30 mm. A consequence of this is that the anchor devices 10, 0 are much less likely to be kicked or tripped over by those working on the construction of the floor, which results in less damage to the anchor devices 10, 110, and less likelihood of injury to the workers.

Various modifications can be made without departing from the scope of the invention. For example, FIGS. 11 and 12 depict an alternative version of the first embodiment of the anchor device 10 shown in FIGS. 1 to 5.

Figure 11:
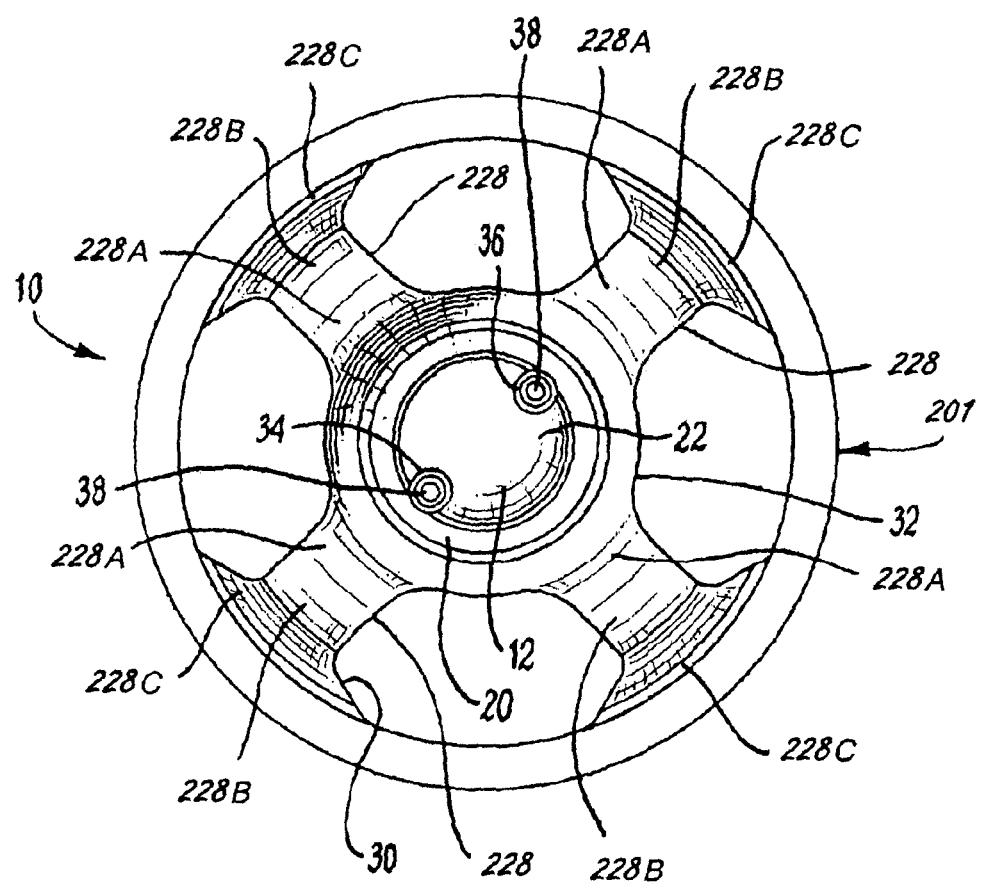
FIG. 11 is a top plan view of an alternative version of the embodiment shown in FIGS. 1 to 5.
Figure 12:
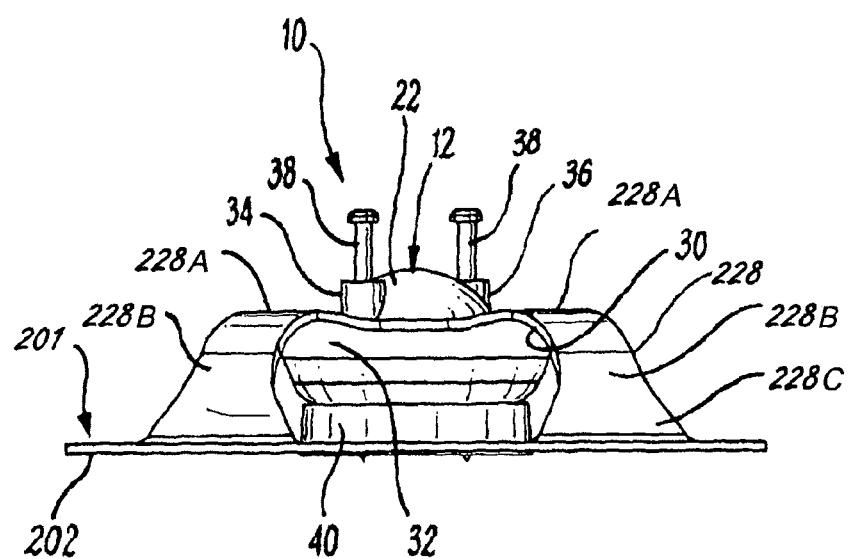
FIG. 12 is a side view of the embodiment shown in FIG. 11.

The embodiment shown in FIGS. 11 and 12 has many of the same features as the first embodiment, and these features have been designated with the same reference numerals as in FIGS. 1 to 5. The anchor device 10 shown in FIGS. 11 and 12 differs from the first embodiment in that it has four equi-spaced fingers 228 instead of eight fingers 28.

In addition, the fingers 228 have distal end regions 228C that taper outwardly from the second region 228B. The distal end regions 228C are connected to a horizontally extending circular flange portion 201, which extends around the fingers 228. The underside 202 of the flange portion 200 engages the form 100 to provide a stable platform for the anchor device 10.

What is claimed is:

1. A method of using an anchor assembly, said anchor assembly comprising an anchor device and an article; the anchor device comprising an article securing arrangement to which the article can be secured; and the article comprising a movable securing mechanism having a main part and a securing member movably mounted on the main part;

wherein the article securing arrangement comprises a body comprising a base element and a cover element extending over the base element, the base element and the cover element defining a cavity to receive the movable securing mechanism; wherein the base element defines an aperture through which the article can be pushed into the cavity, and the article securing arrangement includes a formation in the cavity to co-operate with the movable securing mechanism and secure the article to the anchor device; the securing member being movable relative to the main part from a non-securing position to allow the securing member to be pushed into the cavity, to a securing position to secure the securing member in the cavity and thereby secure the article to the anchor device; and wherein the securing member projects beyond the main part when the securing member is in the non-securing position; wherein the method comprises pushing the securing member through the aperture into the cavity to contact the cover element causing the securing member to move from the non-securing position to the securing position; and wherein the securing member is pivotally mounted on the main part for pivotal movement from the non-securing position to the securing position.

2. A method according to claim 1, wherein the article securing arrangement has an underside and the article is secured to the article securing arrangement through said underside.

3. A method according to claim 2, wherein the article securing arrangement is configured to receive the securing mechanism through said underside.

4. A method according to claim 1, wherein when the securing member is in the non-securing position, the securing member is substantially aligned with the main part, and when the securing member is in the securing position, the securing member extends transverse to the main part.

5. A method according to claim 4, wherein when the securing member is received in the cavity, movement of the securing member to the securing position moves the securing member to a position in which it can extend across the aperture to engage the base element, thereby retaining the securing member in the cavity.

6. A method according to claim 1, wherein the securing member is weighted to pivot automatically from the vertical, non-securing position to the horizontal, securing position upon the securing member being pushed through the aperture into the cavity.

7. A method according to claim 1, wherein the anchor device further comprises a receiving arrangement comprising a plurality of outwardly extending fingers defining at least one gap between adjacent fingers, wherein the, or each, gap provides communication with a space under each of said outwardly extending fingers to allow a curable material to enter said space, wherein the space is disposed between the receiving arrangement and the base element.

8. A method of using an anchor assembly, said anchor assembly comprising an anchor device and an article; the anchor device comprising an article securing arrangement to which the article can be secured; and the article comprising a movable securing mechanism having a main part and a securing member movably mounted on the main part; wherein the article securing arrangement comprises a body comprising a base element and a cover element extending over the base element, the base element and the cover element defining a cavity to receive the movable securing mechanism; wherein the base element defines an aperture through which the article can be pushed into the cavity, and the article securing arrangement includes a formation in the cavity to co-operate with the movable securing mechanism and secure the article to the anchor device; the securing member being movable relative to the main part from a non-securing position to allow the securing member to be pushed into the cavity, to a securing position to secure the securing member in the cavity and thereby secure the article to the anchor device; and wherein the securing member projects beyond the main part when the securing member is in the non-securing position; wherein the method comprises pushing the securing member through the aperture into the cavity to contact the cover element causing the securing member to move from the non-securing position to the securing position; and wherein the cavity is wider than the aperture, whereby when the securing member is received in the cavity, movement of the securing member to the securing position moves the securing member to a position in which it extends across the aperture to engage the base element, thereby retaining the securing member in the cavity.

9. A method according of using an anchor assembly, said anchor assembly comprising: an anchor device for a floor and an article comprising a moveable securing mechanism; the anchor device comprising an article securing arrangement to which the article can be secured; and the article comprising a movable securing mechanism having a main part and a securing member movably mounted on the main part; wherein the article securing arrangement comprises a body comprising a base element and a cover element extending over the base element, the base element and the cover element defining a cavity to receive the moveable securing mechanism, wherein the base element defines an aperture through which the article can be pushed upwardly into the cavity, and the article securing arrangement includes a formation in the cavity to co-operate with the securing member and secure the article to the anchor device; wherein the method comprises pushing the securing member through the aperture upwardly into the cavity to contact the formation causing the securing member to move from a non-securing position to a securing position; and wherein the securing member is weighted to pivot automatically from the vertical, non-securing position to the horizontal, securing position upon the securing member being pushed through the aperture into the cavity.

10. A method according to claim 9, wherein the anchor device further comprises a receiving arrangement comprising a plurality of outwardly extending fingers defining at least one gap between adjacent fingers, wherein the, or each, gap provides communication with a space under each of said outwardly extending fingers to allow a curable material to enter said space, wherein the space is disposed between the receiving arrangement and the base element.

\* \* \* \* \*